United States Patent [19]

Ezekiel et al.

[11] Patent Number: 5,625,783

[45] Date of Patent: Apr. 29, 1997

[54] AUTOMATED SYSTEM AND METHOD FOR DYNAMIC MENU CONSTRUCTION IN A GRAPHICAL USER INTERFACE

[75] Inventors: Alan W. Ezekiel, Bellevue; Bradford A. Christian, Redmond, both of Wash.

[73] Assignee: Microsoft Corporation, Redmond, Wash.

[21] Appl. No.: 354,923

[22] Filed: Dec. 13, 1994

[51] Int. Cl.$^6$ .................................... G06F 15/00
[52] U.S. Cl. .................. 395/352; 395/346; 395/685
[58] Field of Search .................. 395/155–161, 395/700, 600, 650; 345/117–120, 146, 902

[56] References Cited

U.S. PATENT DOCUMENTS

| | | | |
|---|---|---|---|
| 4,823,283 | 4/1989 | Diehm et al. | 395/156 |
| 5,041,967 | 8/1991 | Ephrath et al. | 395/600 |
| 5,072,412 | 12/1991 | Henderson, Jr. et al. | 395/159 |
| 5,115,501 | 5/1992 | Kerr | 395/600 |
| 5,119,475 | 6/1992 | Smith et al. | 395/156 |
| 5,220,675 | 6/1993 | Padawer et al. | 395/156 X |
| 5,287,514 | 2/1994 | Gram | 395/700 |
| 5,345,550 | 9/1994 | Bloomfield | 395/156 |
| 5,392,386 | 2/1995 | Chalas | 395/155 |
| 5,420,975 | 5/1995 | Blades et al. | 395/156 |
| 5,517,606 | 5/1996 | Matheny et al. | 395/156 |
| 5,530,869 | 6/1996 | Salle | 395/700 |

OTHER PUBLICATIONS

Microsoft® Windows™ User's Guide v. 3.0, Microsoft Corp., 1990, pp. xi–xii, xv–xvii, xiv, 54–55.
Foley et al., "Computer Graphics: Principles and Practice", Addison–Wesley Pub. Co., 1990, pp. 435–469.
Myers, "A Taxonomy of Window Manager User Interfaces", IEEE Comp. Graphics and Appl., Sep. 1988, pp. 65–84.
Advanced Interface Design Guide, IBM Corp., Jun. 1989, pp. 16–23.
Boling, "Find. DLL: A Text Search Utility for Windows 3.1", Boling, 1993, pp. 1–7.
Object Linking & Embedding—Version 2.0 for the Windows™ Operating System, "Release Notes Technotes Specification," pp. 1–24 and 293–314, Microsoft Corporation, Apr. 1993.

*Primary Examiner*—Raymond J. Bayerl
*Assistant Examiner*—John E. Breene
*Attorney, Agent, or Firm*—Seed and Berry LLP

[57] ABSTRACT

A processor (CPU) in the computer system executes an application program made up of a number of components, each associated with a set of commands. While the program is executing, a current operating mode of the program is selected. The processor automatically constructs a dynamic menu for the selected operating mode by determining which of the program's components are active in the current operating mode, merging the commands sets of these active components to form an active set of command for the current operating mode, and organizing the commands of the active set into a menu structure. The constructed, displayed menu items can be selected with an input device. Menu items contained in a displayed application menu bar are revised when one of a number of subwindows displayed by the application is selected. Displayed menu items pertaining to a particular subwindow are included in the menu bar when the subwindow is selected. Add-on software components provides additional menu items to those provided by the application program and their implementations without itself having to modify the application's menu bar to add those menu items or intercept and process user input for selecting these menu items.

25 Claims, 9 Drawing Sheets

AUTOMATED SYSTEM AND METHOD FOR DYNAMIC MENU CONSTRUCTION IN A GRAPHICAL USER INTERFACE

TECHNICAL FIELD

The invention relates to computer system user interfaces and more particularly to user interfaces having menus, such as graphical user interfaces.

BACKGROUND OF THE INVENTION

Graphical user interface (GUI) technology has offered computer users the promise of easy, intuitive access to complex computer software. Unfortunately, the reality often falls short of the promise. In particular, the familiar point-and-click menuing interfaces provided by many GUIs become unwieldy and difficult to use when the software that they control is especially complex. The sheer number of menu choices can be bewildering even to the most experienced user.

GUI designers have adopted various approaches in the prior art in their attempts to streamline and simplify menu interfaces. One approach is to provide "accelerator keys" that replace certain menu commands with keyboard inputs and "tool bars" that provide shortcut icons (also known as glyphs) for accessing commonly used functions at the touch of a button. Another approach is to provide hierarchies of menus and submenus. In menu hierarchies, any menu item can be a submenu. Selecting a menu item that is a submenu causes a list of items in the submenu to be displayed. These items (which can include sub-submenus, etc.) can then be selected. In general, the graph of the overall hierarchy &menu bar, menus, and any submenus is a directed acyclic graph.

A third approach to streamlining menu interfaces is to display different menus according to context. The user sees only the menu choices relevant to the particular program context in which the user is currently operating, and so is not faced with a large number of irrelevant choices. An example of such a system in the prior art is found in the interface for the Microsoft Mail for Windows 3.2 electronic mail application program for personal computers, made by Microsoft Corp. (Redmond, Wash.). Microsoft Mail supports various kinds of interface windows, including an "Inbox" window that displays incoming electronic mail messages and a "Send Note" window that allows a user to compose an electronic mail message. Each of these kinds of windows has a "View" menu, but the contents of the "View" menu differs as between the two kinds of windows.

Figure 1A:
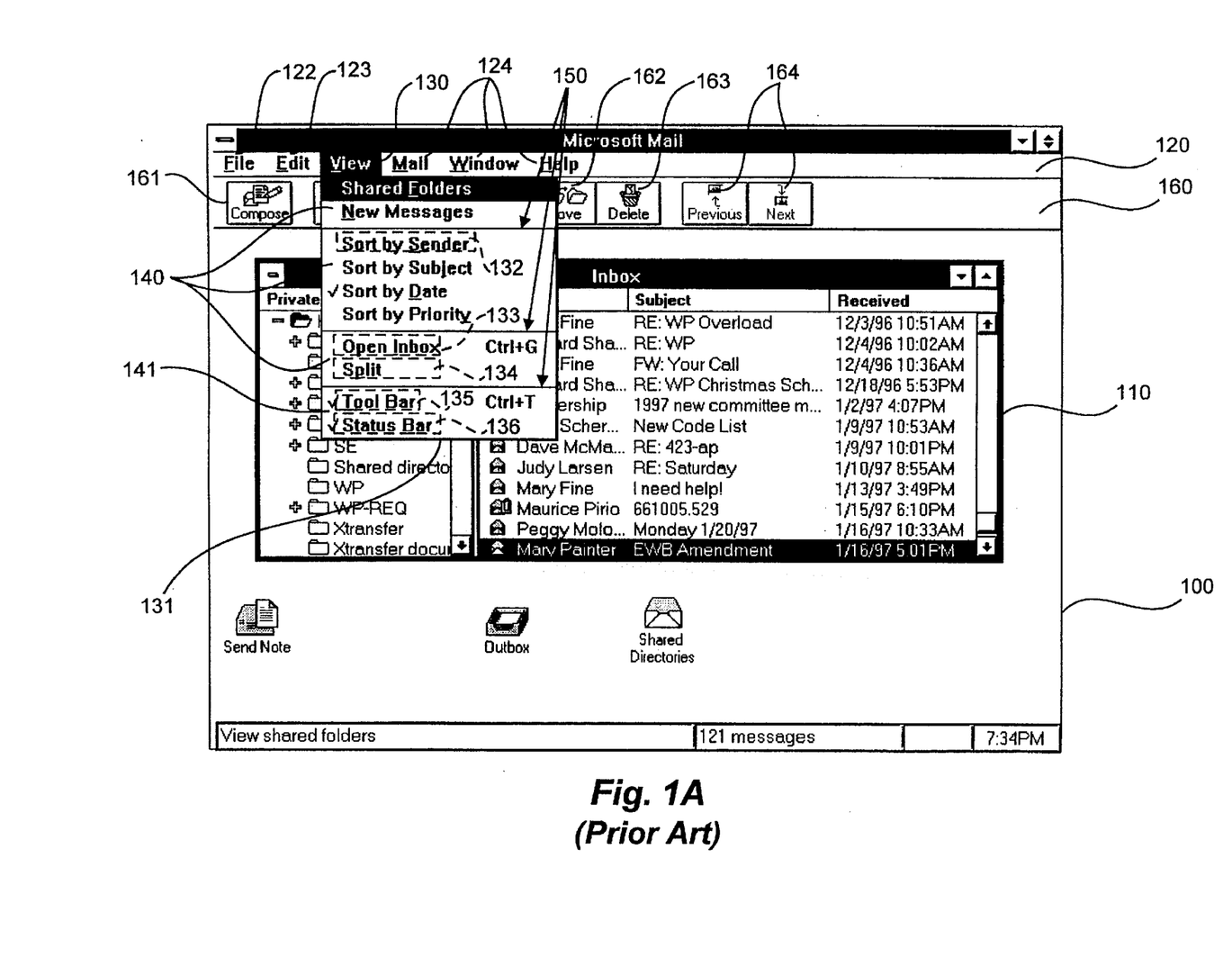
FIGS. 1A–1B are examples of menus in the prior art.

The "Inbox" window is shown in the example of FIG. 1A. The display contains a window 100 that is the master window for the Microsoft Mail program and an "Inbox" window 110. Also shown are a menu bar 120 that includes several menus such as menus 122 ("File"), 123 ("Edit"), and 124 ("Mail," "Window," "Help"), and in particular includes menu 130 ("View"), which is selected and displayed so that its contents 131 can be seen. "View" menu 130 includes items such as items 132 ("Sort by Sender"), 133 ("Open Inbox"), 134 ("Split"), 135 ("Tool Bar"), and 136 ("Status Bar"). Each item can be selected by the user to cause a command to issue to the Microsoft Mail program. Accordingly, menu items are also referred to as menu selections or menu commands. Menu items are grouped into display groups 140, 141 that are visually separated by separator bars 150. Each display group contains one or more related items. Additionally, the display includes a tool bar 160 that has icons (also called glyphs), such as icons 161 ("Compose"), 162 ("Move"), 163 ("Delete"), and 164 ("Previous," "Next"). Each tool bar icon can be selected by the user to cause a command to issue to the program.

Figure 1B:
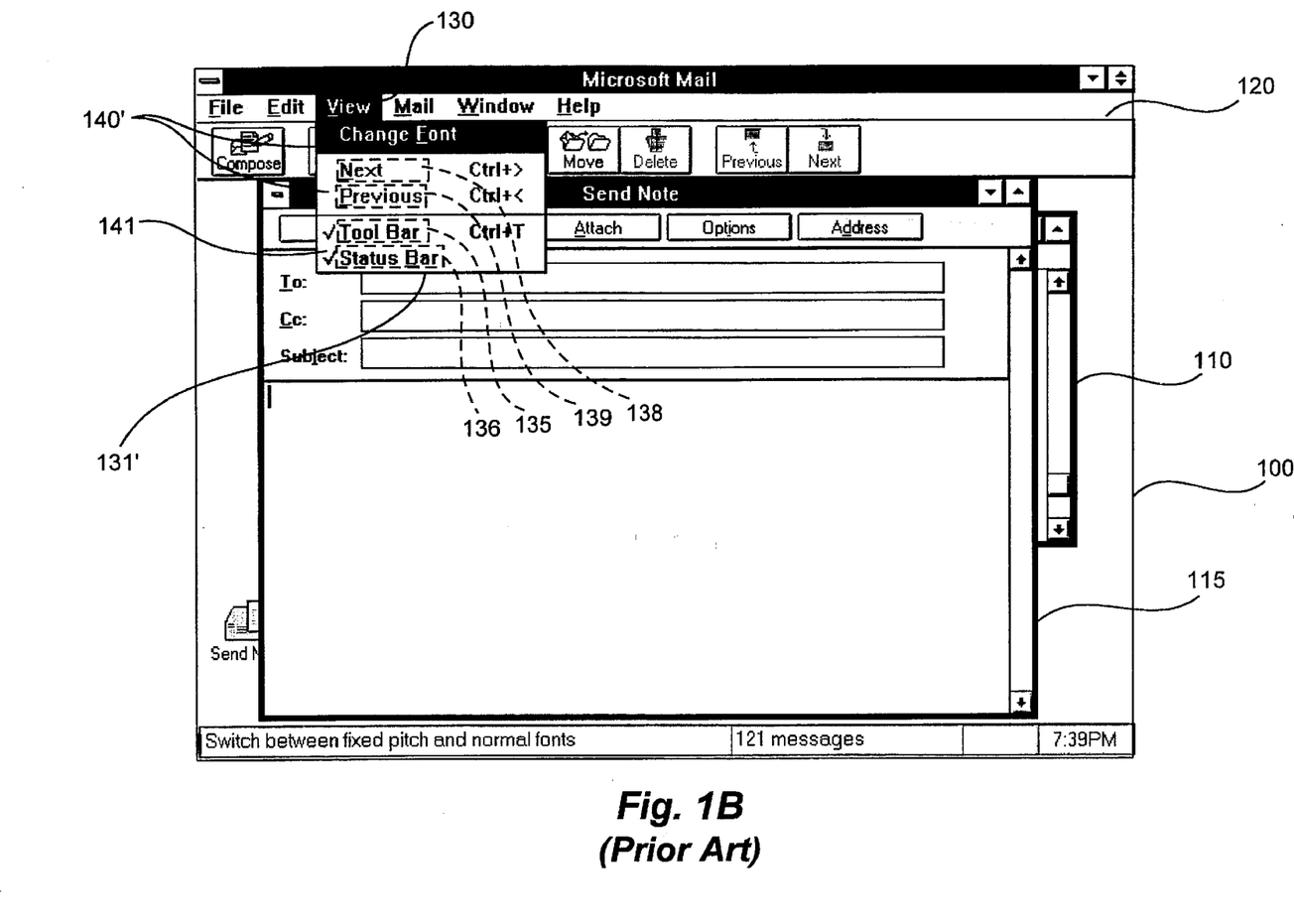

In particular, selecting the "Compose" icon 161 causes a "Send Note" window to appear in the display. This window is shown in the example of FIG. 1B. As in FIG. 1A, the display contains master window 100 and "Inbox" window 110, which is partially hidden behind "Send Note" window 115. "Send Note" window is the active window, that is, the window through which the user is currently interacting with the Microsoft Mail program. Menu bar 120 contains the same items as in FIG. 1A, including "View" menu 130, which is once again shown selected and displayed so that its contents can be seen. However, the contents 131' of "View" menu 130 in FIG. 1B differ from the contents 131 of "View" menu 130 in FIG. 1A, because a different type of window is active. Thus, although display group 141 containing items 135 ("Tool Bar") and 136 ("Status Bar") remains in place, the other display groups 140 of FIG. 1A are replaced by new display groups 140' that contain new menu items such as item 138 ("Next") and item 139 ("Previous"). Also in FIG. 1B, certain menu items of "View" menu 130, such as items 138 and 139, are displayed in a lighter color or different typeface as compared with other items such as items 135 and 136. These differently displayed items are said to be "grayed out," because in a black-and-white display they can appear to be gray instead of black. (Tool bar icons, too, can be grayed out; for example, icon 163 is shown in black in FIG. 1A but grayed out in FIG. 1B, and icons 164 are shown grayed out in both FIG. 1A and FIG. 1B.)

Menus that change automatically according to the active window type are easier to use than fixed menus are. Unfortunately, as computer programs have become increasingly complicated, providing such menus has become increasingly cumbersome. Known menuing systems and methods determine the menu contents to be displayed by selecting the appropriate contents from among several possibilities that are determined ahead of time by the program designer and are stored accessibly to the program. For example, the "View" menu 130 of FIGS. 1A and 1B can have two possibilities stored, one corresponding to the contents 131 displayed in FIG. 1A and another corresponding to the contents 131' displayed in FIG. 1B. As window types and menus proliferate, the number of possibilities that must be designed and stored increases, so that this approach of known systems and methods becomes increasingly unworkable.

Moreover, the approach of known systems and methods is inflexible, in that all possible menu contents must be determined ahead of time. There is no convenient way to incorporate unanticipated new functionality into an existing set of menus. For example, suppose that an application program is originally designed and developed by certain program developers, and that at a later date, certain other program developers (possibly from a different software company) want to develop add-on software components that can be used with the application program to give it new features and enhanced functionality. Of course, the new developers would like their add-on software to include a user interface so that users can access their new features. The new developers quickly find themselves at an impasse, however, because the entire set of possible menus (and perhaps a very limited list of permissible extensions) has already been determined and coded into the application program by the original designers. The new developers cannot add items to existing menus without modifying the original program, and as a practical matter they cannot modify the original program because it is already in the hands of thousands or millions of users. Often, the best that the add-on developers can do is to graft a new menu or menus onto the menu bar (if the computer's operating system or the application program supports this). The resulting interface is aesthetically unpleasing and awkward to use, and so does not deliver on the promise of GUIs.

SUMMARY OF THE INVENTION

The present invention provides a method and system by which a computer can automatically and dynamically construct user interface menus "on the fly" during execution of a program. For example, the computer can reconfigure displayed menus responsively to a change in the operating mode of the program or selection of a new active window type. Furthermore, the invention provides seamless integration of new menu items into an existing set of menus when new software components are added to an existing program. Thus the invention facilitates the development of add-on software for application programs.

In one aspect, the invention provides a method for dynamic menu construction in a graphical user interface (GUI). A processor (CPU) in a computer system executes an application program made up of a number of components. Each component is associated with a set of commands. While the program is executing, a current operating mode of the program is selected. The processor automatically constructs a menu for the selected operating mode by determining which of the program's components are active in the current operating mode, merging the command sets of these active components to form an active set of commands for the current operating mode, and organizing the commands of the active set into a menu structure. The constructed menu can be displayed using a visual display, and commands from the menu can be selected with an input device.

The invention will be better understood with reference to the drawings and detailed description below. In the drawings, like reference numerals indicate like components.

DETAILED DESCRIPTION OF THE INVENTION

Overview

In a specific embodiment to be described, the invention provides automatic run-time menu construction in an application program having a graphical user interface (GUI) that supports multiple active windows of various types. Menu items (commands) from two or more different software components can be integrated into a single menu and can be assigned to a particular display group within the menu. The specific embodiment is implemented in Microsoft Visual C++ 2.0, an application program that provides a development environment for the well-known C++ programming language. Visual C++ runs in the context of an operating system that has GUI and windowing capabilities, such as Microsoft® Windows™ NT or, in the specific embodiment, Microsoft® Windows™95.

Visual C++ provides various types of windows. A user developing a C++ software program in Visual C++ can have several windows of different types open simultaneously. For example, the user can have open a source code editor window, various types of debugging windows, and various types of resource editor windows, which are used, for example, to control the appearance of the user interface of the software program being developed. At any given time, one of the open windows is selected as the active window through which Visual C++ interacts with the user. The displayed menus change according to what type of window (source code, debugger, resource editor, etc.) is active. Thus as windows are opened, closed, or selected, Visual C++ dynamically recreates the menu bar and the menus according to the invention so as to provide access to a set of commands appropriate for the current active window.

Visual C++ is structured as a shell into which one or more software components called dynamically linked library components, or DLLs, can be incorporated to provide different aspects of the program's functionality. (Technically speaking, the shell itself is also a DLL.) To incorporate a DLL into Visual C++, the DLL is loaded into memory with the program and thereafter is executed as part of the program. New DLLs can be developed as add-ons to Visual C++ and can be loaded into the shell without any need to modify the underlying Visual C++ program.

According to the invention, the menus displayed by Visual C++ are automatically configured at run time so as to provide the user with access to the commands for the particular DLLs that have been loaded. This makes the program readily extensible. For example, suppose a DLL is written to enable source code programming in a programming language other than C++, such as FORTRAN or Pascal, using the resource editor and debugging facilities of the underlying Visual C++ program. The new DLL can be linked into the Visual C++ environment, and Visual C++ will automatically incorporate the commands for the newly linked DLL into the displayed menus. There is no need to modify the Visual C++ shell or the DLLs provided as standard components with Visual C++ in order to add a new DLL. Quite simply, from the user's standpoint, the new code just plugs in and runs and the menus automatically take care of themselves.

System Components

Figure 2:
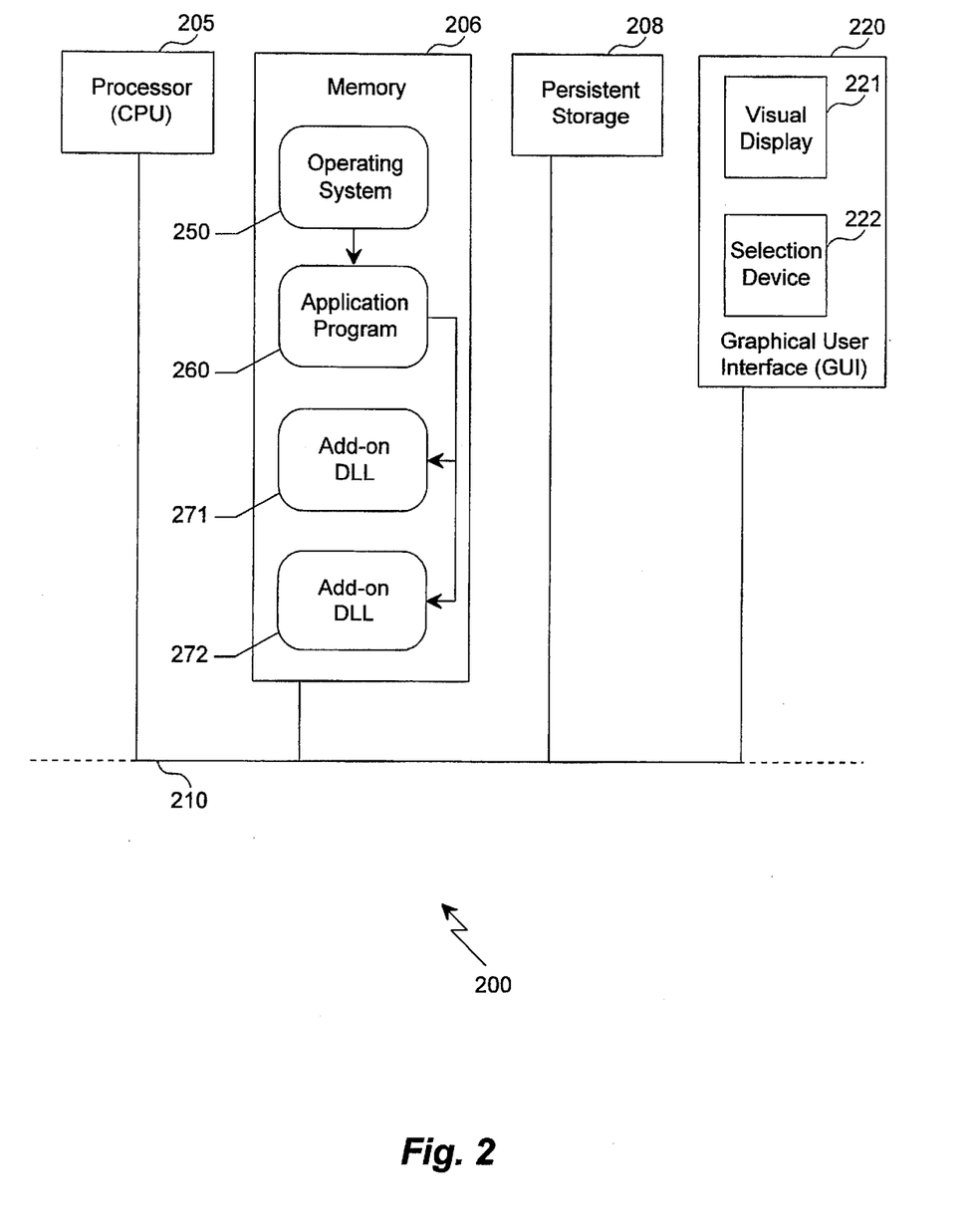
FIG. 2 illustrates the components of a computer system suited to an embodiment of the invention.

FIG. 2 illustrates a computer system 200 in which the specific embodiment of the invention can be implemented. The hardware of system 200 includes a processor (CPU) 205, a memory 206, a persistent storage 208, and hardware for a graphical user interface (GUI) 220, coupled by a local bus or interface 210. System 200 can further include additional hardware components (not shown).

System 200 can be, for example, a personal computer or workstation. Processor 205 can be, for example, a microprocessor, such as the 80386, 80486 or Pentium™ microprocessor, made by Intel Corp. (Santa Clara, Calif.).

Memory 206 can include, for example, random-access memory (RAM), read-only memory (ROM), virtual memory, or any other working storage medium or media accessible by processor 205. Persistent storage 208 can include a hard disk, a floppy disk, an optical or magneto-optical disk, or any other persistent storage medium.

GUI 220 facilitates communications between a user and system 200. Its hardware includes a visual display 221 and a selector device 222. Through visual display 221, system 200 can deliver graphical and textual output to the user and, in particular, can display windows, menu bars, and menus. From selector device 222, system 200 can receive inputs indicating the user's selection of particular windows, menus, and menu items. Visual display 221 can include, for example, a cathode-ray tube (CRT) or flat-panel display screen, or a head-mounted display such as a virtual reality display. Selector device 222 can be, for example, a two-dimensional pointing device such as a mouse, a trackball, a trackpad, a stylus, a joystick, or the like. Alternatively or additionally, selector device 222 can include a keyboard, such as an alphanumeric keyboard with function and cursor-control keys.

The software of system 200 includes an operating system 250 and an application program 260, and can further include one or more add-on software components (DLLs) 271, 272 designed to operate in conjunction with application program 260. The software of system 200 can further include additional application programs (not shown). Operating system 150 can be, for example, the Microsoft® Windows™95 operating system for IBM PC and compatible computers having or emulating Intel 80386, 80486, or Pentium™ processors. Application program 160 is Visual C++ 2.0 in this embodiment. Persons of skill in the art will appreciate that a wide range of hardware and software configurations can support the system and method of the present invention in various specific embodiments.

Figure 3A:
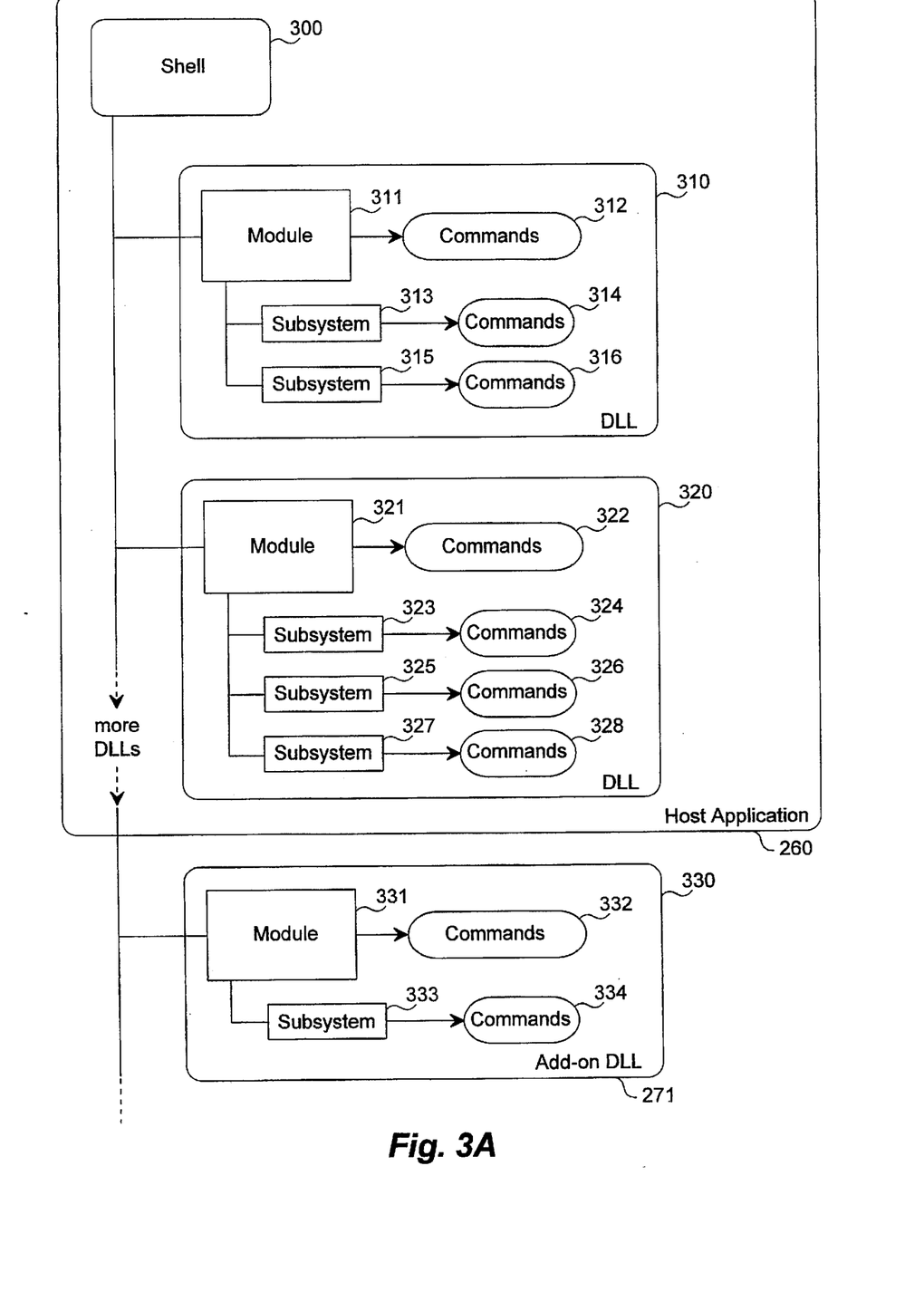
FIG. 3A schematically depicts an example of the structure of an application program suited to an embodiment of the invention.
Figure 3B:
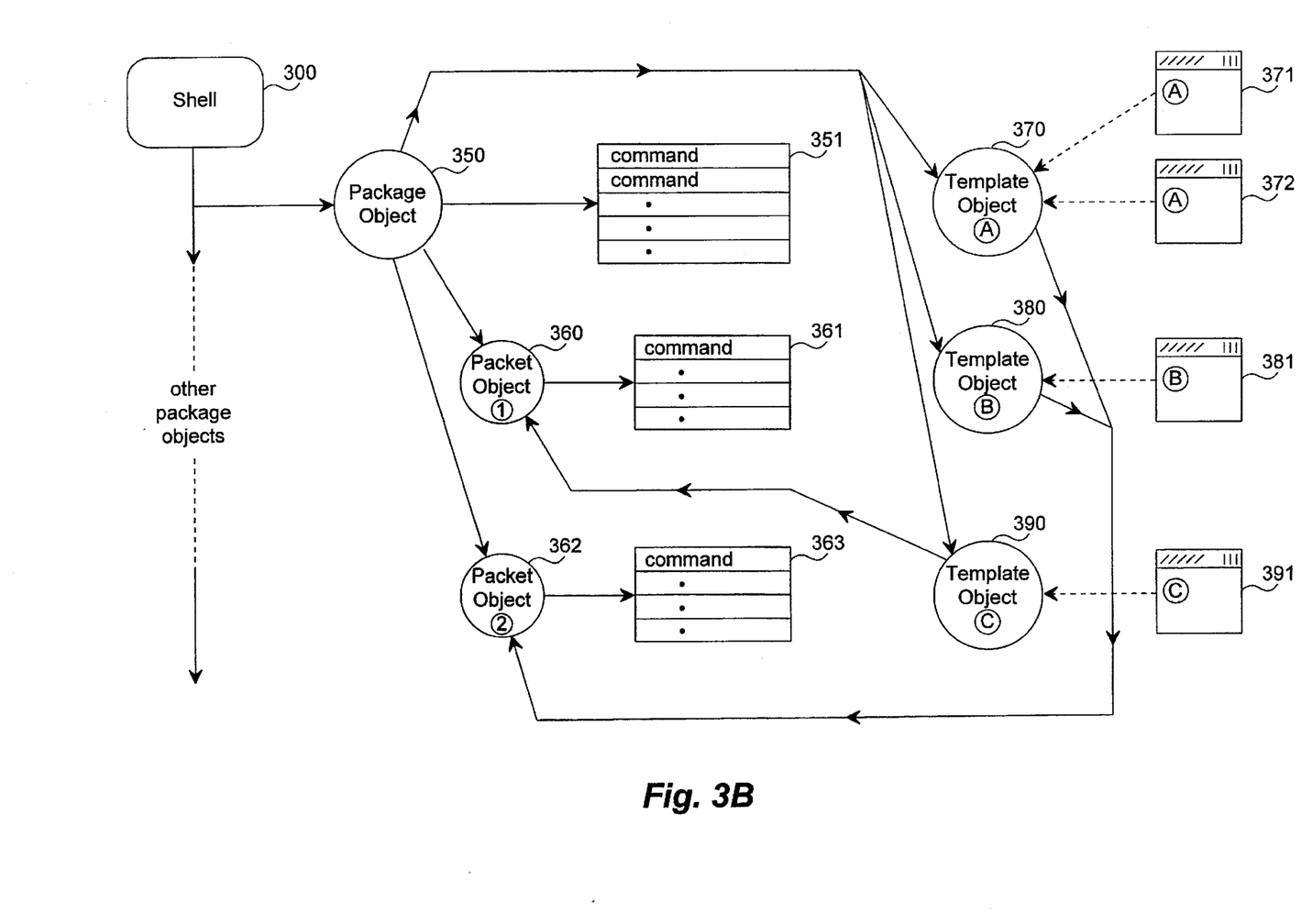
FIG. 3B is an example of package object and related objects.

The invention facilitates automated menu construction by appropriate support structures, as shown in FIGS. 3A–3B. FIG. 3A schematically depicts the structure of an example application program 260 and shows its relationship to add-on software components including add-on component 271. Application program 260 is organized as a modular system, in which shell 300 governs one or more modules, such as modules 311 and 312 and additional modules (not shown), that provide different aspects of the program's functionality. Each module has associated commands that can be made available to the user through menus whenever a window associated with the module's functionality is active. In particular, module 311 has associated commands 312 and module 321 has associated commands 322. Optionally, each module can have one or more associated subsystems each of which can have its own associated commands specific to its use. In particular, module 311 has subsystems 313, 315 which have associated commands 314, 316 respectively, and module 321 has subsystems 323, 325, 327 which have associated commands 324, 326, 328, respectively. Additionally, shell 300 can include its own set of commands (not shown).

In the specific embodiment, the combination of a module and its associated commands, subsystems, and subsystem commands is called a package. A package is a particular kind of DLL that has the structure of modules, commands, subsystems, and subsystem commands that have been described, and that adheres to certain protocols according to the method of the invention that will be more fully described below with reference to FIG. 4. The subsystems affiliated with a package are called packets. In FIG. 3A, module 311 and its affiliated commands, subsystems, and subsystem commands make up package 310, and module 321 and its affiliated commands, subsystems, and subsystem commands make up package 320. Shell 300 is also considered to be a package. Subsystems 313 and 315 are the packets of package 310, and subsystems 323, 325, and 327 are the packets of package 320.

Besides shell 300 and packages 310 and 320, which come with application program 260 as standard components, application program 260 can support optional add-on components. Add-on components can be developed either by the designers of application program 260 or by third-party developers. Application program 260 is referred to as a host program or host application with respect to its add-on components. Like standard components, add-on components are packages. They support the same kinds of internal structures and conform to the same protocols as their standard counterparts. In FIG. 3A, component 271 is an add-on component that "plugs into" application program 260. Component 271 is a package that is made up of module 331, module commands 332, subsystem (packet) 333, and packet commands 334.

FIG. 3B shows the relationships among objects used to represent various software components in application program 260. Objects, in the sense of "object-oriented programming," encapsulate related information and functionality within a program as is well-known in the art. Each package in application program 260 is represented by a package object. Each subsystem (packet) is represented by a packet object. Shell 300 maintains pointers to all package and packet objects in application program 260 and in any add-on components such as components 271, 272.

Commands for a package or for its packets are represented by command tables. Command tables are data structures, such as arrays, that contain information about individual commands. Each entry in a command table can contain, for example, the name of a command; information used for displaying the command name and related text; information that tells whether the command is bound to a menu, tool bar, accelerator key, or other user interface mechanism; a tool bar icon, if the command is bound to a tool bar button; and a unique identifier, for example an integer that uniquely specifies the command. Further, according to the invention, each entry in a command table also contains a group identifier, such as an integer, which indicates the display group to which the command should be assigned when a menu containing the command is constructed. Any two or more menu items that are to be included in the same display group within a menu will share a common group identifier. Group identifiers are used in sorting commands into functional or logically related groups for display, and thus promotes the construction of easy-to-use menus. The set of available group identifiers can be assigned by program designers or, in some embodiments, determined automatically by the computer, for example by shell 300 at run time, so that display groups unanticipated by the original developers of application program 260 can readily be added by later developers of add-on components.

In FIG. 3B, package object 350 corresponds to package 310 of FIG. 3A. Package object 350 maintains a pointer to command table 351 which corresponds to module commands 310, a pointer to packet object 360 which corresponds to subsystem 313, and a pointer to packet object 362 which corresponds to subsystem 315. Packet object 360 ("packet object 1") maintains a pointer to command table 361 which corresponds to commands 314, and packet object 362 ("packet object 2") maintains a pointer to command table 363 which corresponds to commands 316. Although each of packet objects 360 and 362 points to its own command table, it is also possible for two or more packet objects to point to the same command table so that their respective packets share commands, or for a packet not to point to any command table, so that its corresponding packet adds no commands to the package in which it resides.

Package object 350 also points to template objects 370 ("template object A"), 380 ("template object B"), and 390 ("template object C"). Each template object corresponds to a particular type of window. For example, windows 371 and 372 are of the type ("A") associated with template object 370, window 381 is of the type ("B") associated with template object 380, and window 391 is of the type ("C") associated with template object 390. Windows 371, 372, 381, and 391 are windows that can be displayed in visual display 221.

The relationship between packages, packets, command tables, template objects, and windows can be explained more concretely in terms of the behavior of application program 260 in the specific embodiment. In Visual C++ 2.0, the standard packages (apart from the shell) include a package that provides the source code editing and debugging capabilities of the program, a package for resource editing, and a package for project management. The source editor-debugger package supports a source editor packet and several debugger packets including packets for stack analysis, memory display, register display, disassembly, etc. The resource editor package includes packets for editing dialog boxes, keyboard accelerators, display strings, icon bit maps, cursor bit maps, etc. The project management system has no packets.

Each of the three standard packages in Visual C++ 2.0 supports one or more types of user interface windows. Each of the window types has an associated template object. The commands that appear in the menus for an active window of a given type can include package commands provided by the packer's module, and packet commands provided by individual packets of the package. For example, in FIGS. 3A–3B, window 371 is associated with template object 370, which points to packet object 362, which corresponds to subsystem (packet) 315. Thus the commands that can be displayed when window 371 is active include the commands 312 provided by module 311 of package 310, which are stored in command table 351, and the commands 316 of subsystem 315, which are stored in command table 363. Similarly, window 391 is associated with template object 390, which points to packet object 360, which corresponds to subsystem (packet) 313. The commands that can be displayed when window 391 is active include the commands 312 provided by module 311 of package 310, which are stored in command table 351, and the commands 314 of subsystem (packet) 313, which are stored in command table 361.

A practical benefit of providing separate objects and command tables for packages and packets is that the package commands can be used flexibly with windows of several types, or even when no windows are open, and packet commands can provide more specialized commands appropriate to particular types of window. In FIG. 3B, the package commands stored in command table 351 can be made available, for example, in all of window types "A," "B," and "C" (corresponding to template objects 370, 380, and 390, respectively) and also when no window is open, whereas packet commands from command table 361 can be made available specifically in type "C" windows, and packet commands from command table 362 can be made available specifically in type "A" or type "B" windows.

Method Steps

As indicated above, a package, whether standard or add-on, adheres to certain protocols according to the method of the invention. In particular, a package notifies shell 300 of its existence and informs shell 300 of its command tables and its packets, if any, and their respective command tables, if any. This process of notification is called registering with the shell, or registration. Registration can take place, for example, as part of an initialization sequence that is performed automatically when application program 260 begins executing.

Figure 4:
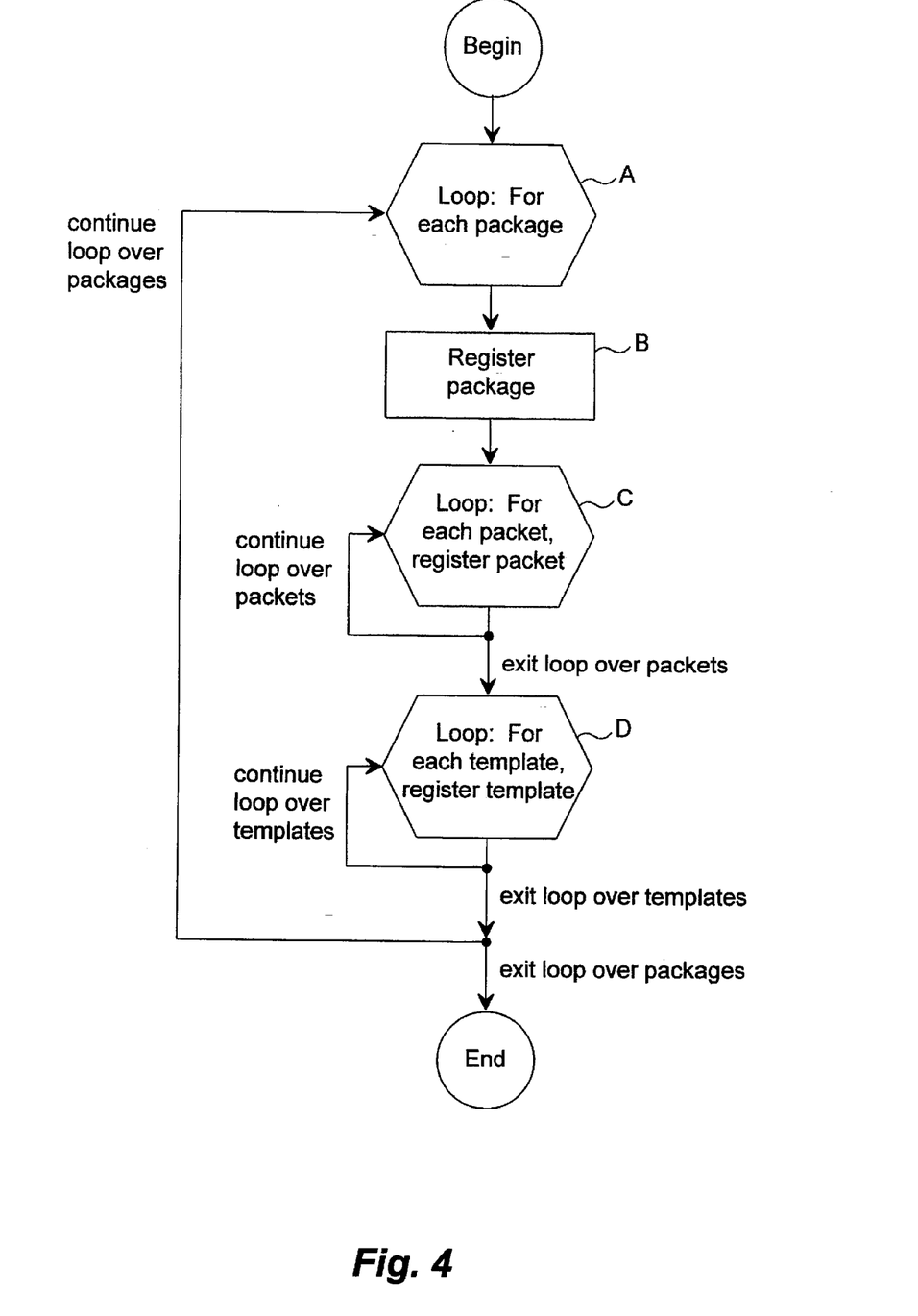
FIG. 4 is a flowchart of the steps for package registration.

The steps of registration are illustrated in the flowchart of FIG. 4. Each package loaded with application program 260 is considered in turn (step A). The package currently being considered calls a package registration function to register itself with shell 300 (step B), and also calls a packet registration function for each of its packets, if any, to register them as well (step C). Additionally, the package calls a template registration function for each of its template objects (step D). By registering the template objects, the package informs shell 300 about the types of windows with which the package can work, and about the packets that are to be used in constructing the menus for these particular types of windows. In other words, registering the template objects creates a link between window types and packets, and thus between windows and packet command tables. Shell 300 provides the package, packet, and template registration functions.

Figure 5:
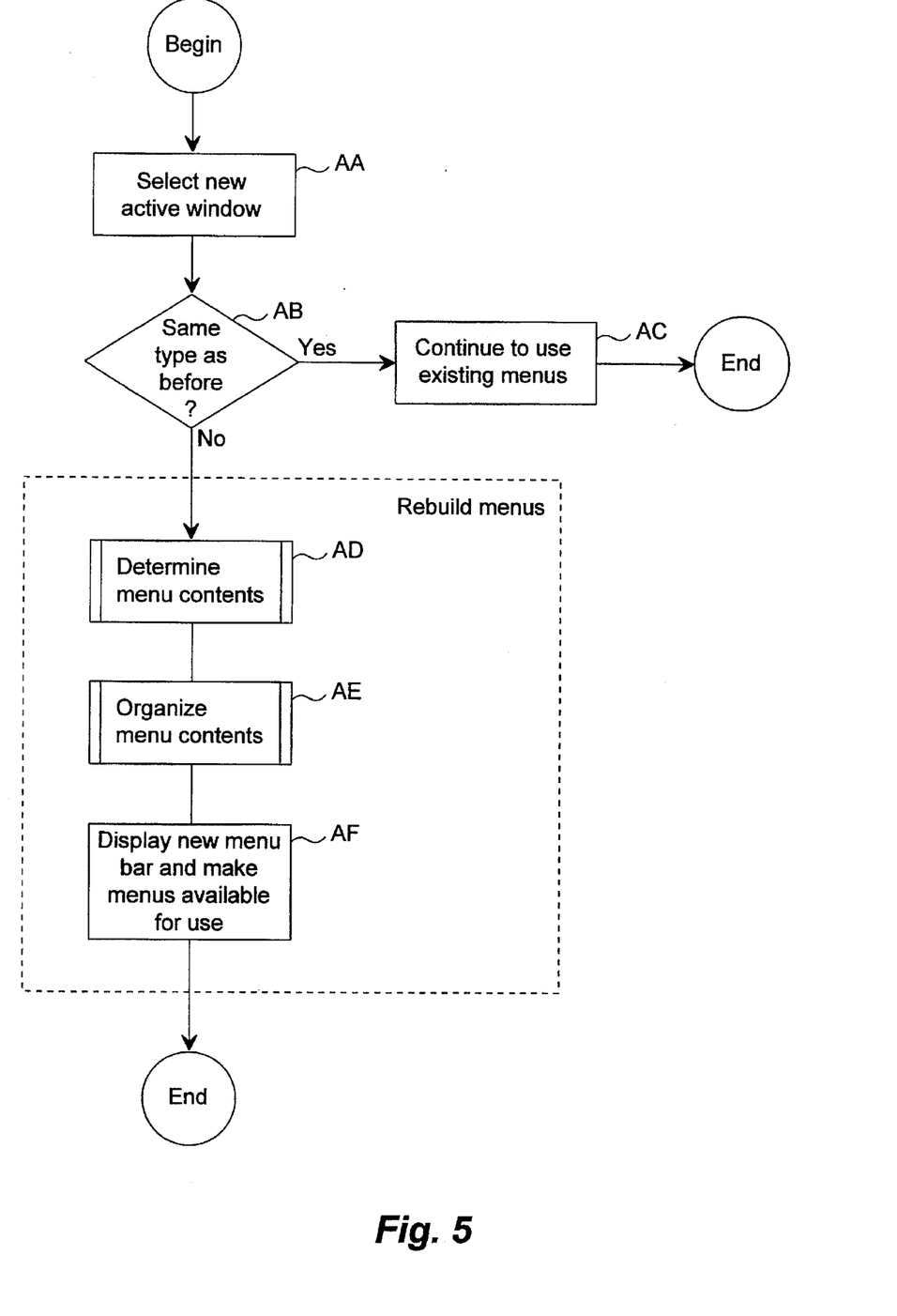
FIG. 5 is a high-level flowchart of the steps for dynamically constructing menus.

The high-level steps for constructing the menus according to the method of the invention in the specific embodiment are illustrated in the flowchart of FIG. 5. At the start of FIG. 5, it is assumed that application program 260 is executing and that all packages have been registered with shell 300, so that shell 300 has current information about all packages and packets and their respective command tables and can readily obtain the group identifier and unique identifier for each command.

Whenever a new window is selected, opened, or otherwise becomes the active window (step AA), application program 260 determines whether the newly selected window is of the same type as any previously selected window (step AB). If so, application program 260 continues to use the same menus as for the previously selected window (step AC). However, if the new window is of a different type, or if no window was previously open, the menu bar and all menus to be displayed are rebuilt from scratch. Preferably this takes place quite rapidly so that the user perceives no delay in presentation of the new menus.

To rebuild the menu bar and menus (steps AD, AE, and AF), application program 260 determines what packages and packets are active and gathers the commands from the command tables of these packages and packets (step AD). It then constructs a complete menu hierarchy including a menu bar, menus, and submenus, if any, in which the commands from the various command tables are organized according to their display groups (step AE). The resulting menu bar is displayed in visual display 221, and the menus and submenus therein become available for selection by the user with selector device 222 (step AF).

Upon the user's selection of a displayed menu item from the newly constructed menu, shell 300 executes the corresponding command. For example, shell 300 can send a message to the package object that supplied the command requesting that the package object carry out a member function or other procedure that implements the command.

Figure 6:
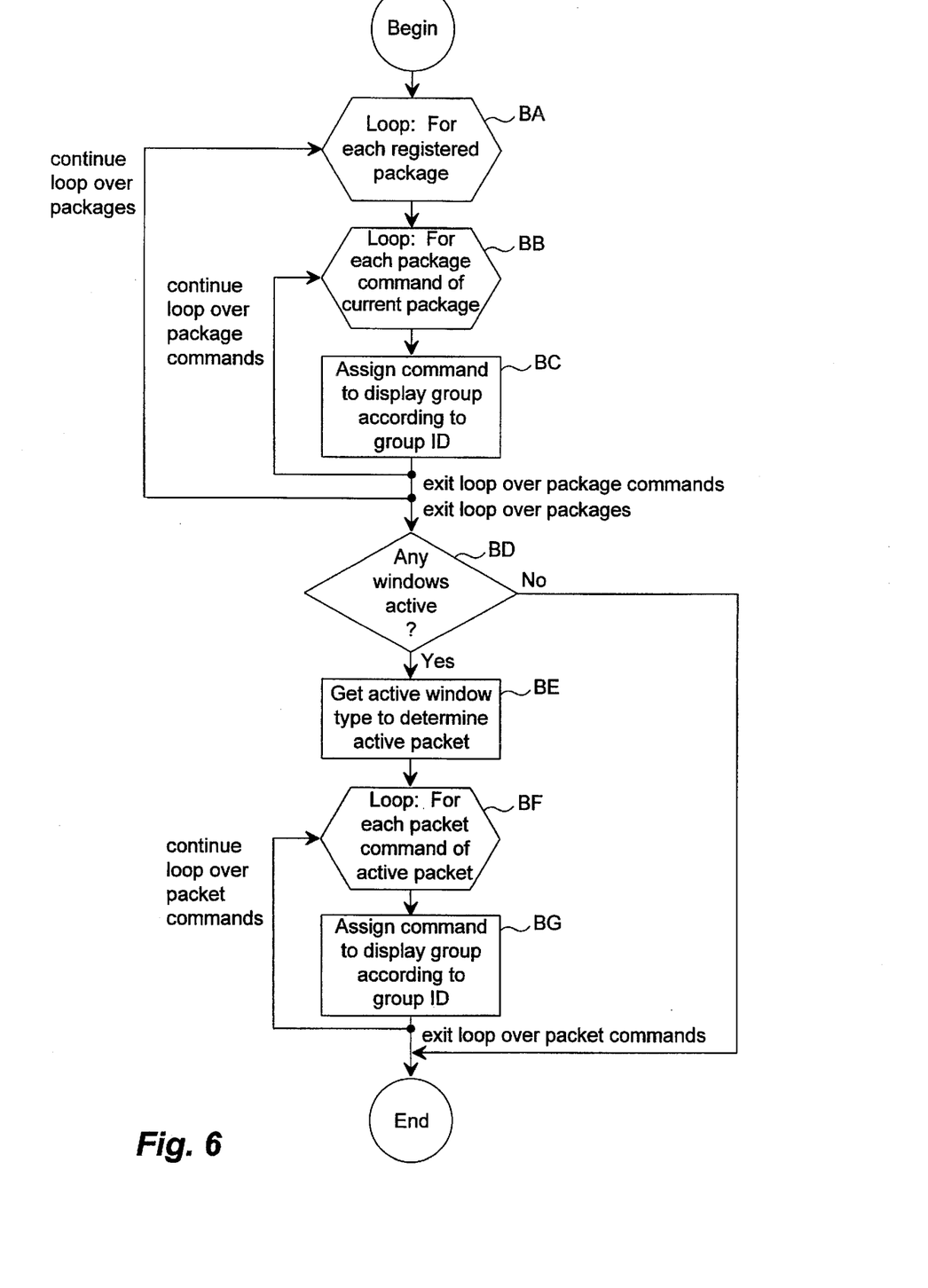
FIG. 6 is a more detailed flowchart of the steps for determining menu contents.

The step of determining the contents of the menu bar and menus (step AD) is shown in greater detail in the flowchart of FIG. 6. For each registered package (step BA), shell 300 considers in turn each of the commands in the package's command table (step BB), and assigns each of these package commands to a display group according to the command's group identifier (step BC). Shell 300 then checks to determine whether any windows are active (step BD). If there is an active window, shell 300 checks to determine the active packet for the active window, that is, the packet pointed to by the template object for the active window (step BE). Shell 300 considers in turn each of the commands in the active packet's command table (step BF), and assigns each of these packet commands to a display group according to the command's group identifier (step BG).

Figure 7:
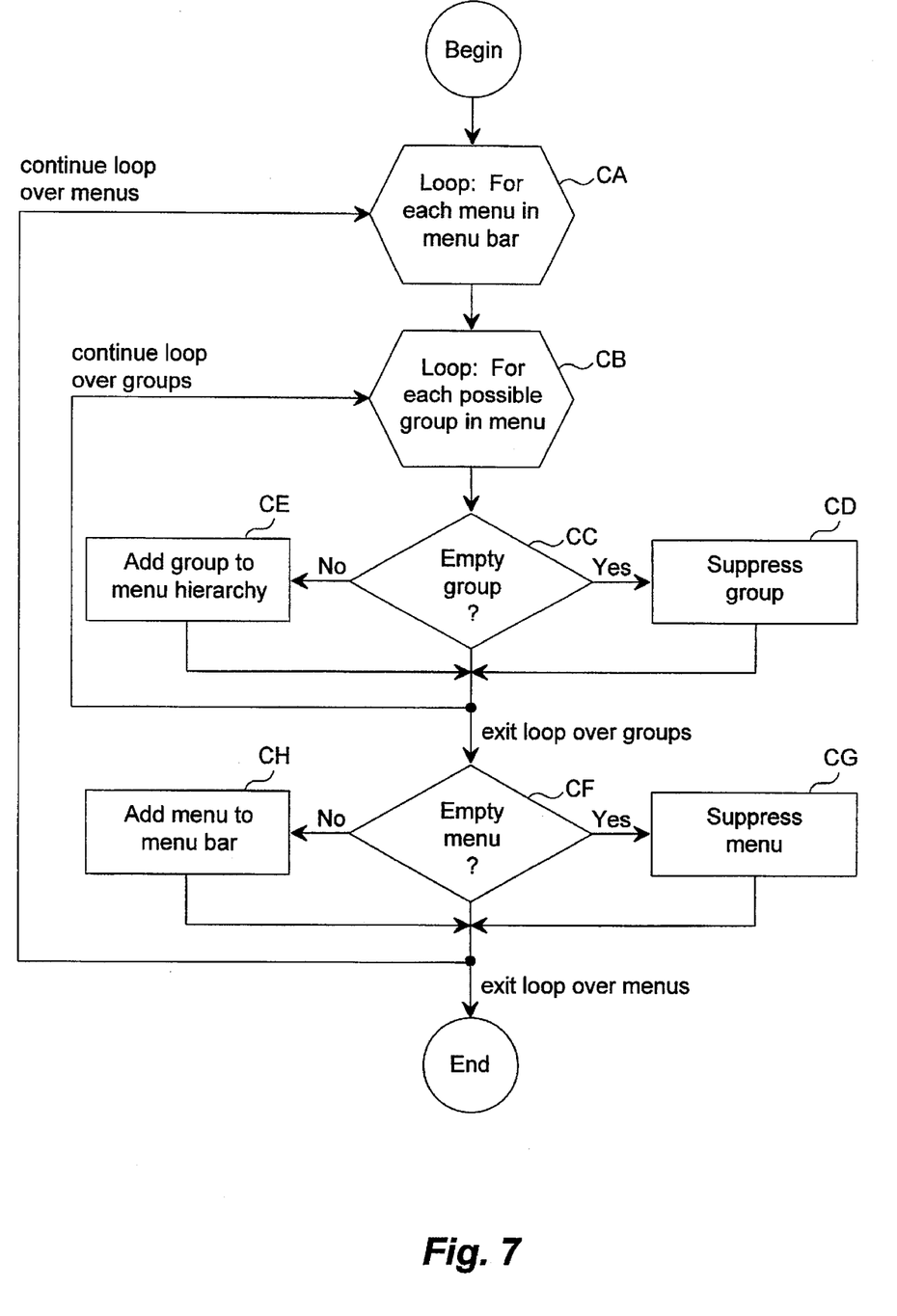
FIG. 7 is a more detailed flowchart of the steps for organizing menu contents.

The step of organizing the contents of the menu bar and menus (step AE) is shown in greater detail in the flowchart of FIG. 7. In the specific embodiment, shell 300 uses an organizational plan that is predetermined and built into the design of application program 260. The organizational plan provides a guideline as to which menus are to be included in the menu bar and in what order, and which groups are to be included in particular menus and in what order. It is readily extensible to new groups and menus introduced by add-on software components. For example, the add-on components can specify where a new group or menu is to appear in relation to an existing group or menu.

Shell 300 uses the plan to create a data structure that represents the menu hierarchy to be displayed and that can be provided as input to the menu display routines of step AF. To build the data structure, shell 300 considers in turn each possible menu in the menu bar (step CA). Within the menu currently under consideration, shell 300 considers in turn each group identifier that could possibly appear in the menu (step CB). If, according to the menu contents as previously determined in step AD, no commands are assigned to a display group for this group identifier (step CC), then the group is suppressed from the menu (step CD). Otherwise, the group is included in the menu as a display group that contains the previously determined commands (step CE). Processing continues until all possible groups of the menu have been considered. If the resulting menu is empty because all of its groups were suppressed (step CF), then the entire menu is suppressed (step CG). Otherwise the menu is included in the menu bar (step CH). Processing continues until all possible menus have been considered.

In a variation on the foregoing method steps, a package can provide a group of placeholder commands. A placeholder command is one that is not necessarily bound to executable code, but which can optionally be bound according to the particular active window type and its corresponding packet. If the commands of the group are indeed bound, then they are included in the menu in step CE as previously described. However, if the commands are not bound, they are still included in the menu, rather than being suppressed in step CD. Shell 300 indicates that the placeholder commands are unavailable by causing them to appear "grayed out" in the display. An advantage of this variation is that very common commands, such as certain basic editing commands like cut, copy, paste, and undo, can be made always to appear in the menus by including them as placeholders in the shell package. For such basic commands, it is often less confusing for users if they are always displayed even if unavailable, rather than appearing and disappearing as the more specialized packet commands do.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

We claim:

1. In a computer system comprising a processor, a method comprising the steps of:

executing an application program with the processor, the application program comprising a plurality of components, each component being associated with a set of commands;

while executing the application program, selecting a current operating mode from among a plurality of possible operating modes of the application program; and constructing automatically with the processor a menu for the selected current operating mode, the menu comprising an organized structure of commands pertinent to the current operating mode, by determining from among the plurality of components of the application program a collection of active components for the current operating mode, merging the command sets of the active components to determine an active set of commands for the current operating mode, and organizing the commands of the active set into a menu structure, wherein the computer system further comprises a graphical user interface (GUI) providing a windowing capability for the application program that enables the application program to display an application window and two or more subwindows, and wherein each subwindow displayed by the application program corresponds to one of the possible operating modes, and wherein:

the step of selecting a current operating mode selects the operating mode to which a subwindow displayed by the application program designating as active in the graphical user interface corresponds.

2. A method in a computer system for revising menu items contained by a displayed application menu bar when a subwindow of an application window is selected, the method comprising the steps of:

executing an application program;

under the control of the application program, displaying the application window, the application window having a menu bar containing menu items, the application window further containing a plurality of subwindows;

receiving user input for selecting a specified one of the plurality of subwindows;

in response to the received user input, selecting the specified subwindow; and in response to the step of selecting the specified subwindow, revising the menu items contained by the displayed menu bar.

3. The method of claim 2 wherein the revising step revises the menu items contained by the displayed menu bar to include menu items pertaining to the specified subwindow.

4. The method of claim 3 wherein the menu bar contains a plurality of menus, and wherein each of the menu items pertaining to the specified subwindow are associated with one of the menus, and wherein the revising step includes the step of adding each menu item pertaining to the specified subwindow to the menu with which the menu item is associated.

5. The method of claim 4 wherein the menus each contain at least one menu item group, and wherein each of the menu items pertaining to the specified subwindow are associated with one of the menu item groups, and wherein the revising step includes the step of adding each menu item pertaining to the specified subwindow to the menu item group with which the menu item is associated.

6. A computer-readable medium whose contents cause a computer system to revise command names contained by a displayed application menu bar, by performing the steps of:
under the control of an application program, displaying an application window of the application program, the application window having a menu bar containing command names, the application window further containing a plurality of subwindows;
receiving user input for selecting a specified one of the plurality of subwindows;
in response to the received user input, selecting the specified subwindow; and
in response to the step of selecting the specified subwindow, revising the command names contained by the displayed menu bar.

7. The computer-readable medium of claim 6 wherein the revising step revises the command names contained by the displayed menu bar to include command names pertaining to the specified subwindow.

8. The computer-readable medium of claim 6 wherein the menu bar contains a plurality of menus, and wherein each of the menu items pertaining to the specified subwindow are associated with one of the menus, and wherein the revising step includes the step of adding each command name pertaining to the specified subwindow to the menu with which the command name is associated.

9. The computer-readable medium of claim 8 wherein the menus each contain at least one command name group, and wherein each of the command names pertaining to the specified subwindow are associated with one of the command name groups, and wherein the revising step includes the step of adding each command name pertaining to the specified subwindow to the command name group with which the command name is associated.

10. A computer system for revising menu items contained by a displayed application menu bar when a subwindow of an application window is selected, comprising:
a processor for executing an application program;
a display device coupled to the processor for displaying, under the control of the application program, the application window, the application window having a menu bar containing menu items, the application window further having a plurality of subwindows;
a user input device coupled to the processor for receiving user input for selecting a specified one of the plurality of subwindows;
a subwindow selection subsystem for selecting the specified subwindow; and
a menu item revision subsystem for, in response to the selection of the specified subwindow by the subwindow selection subsystem, revising the menu items contained by the menu bar displayed by the display device.

11. The computer system of claim 10 wherein the menu item revision subsystem revises the menu items contained by the menu bar to include menu items pertaining to the specified subwindow.

12. A method in a computer system for differentially executing implementations of a selected menu item based on the type of a selected application window subwindow, the method comprising the steps of:
executing an application program;
under the control of the application program, displaying an application window, the application window having a menu bar containing a menu item, the application window further containing a plurality of subwindows each of a different type, one of the subwindows being a selected subwindow;
receiving user input selecting the menu item;
in response to the selection of the menu item, selecting one of a plurality of implementations of the menu item based on the type of the selected subwindow; and
executing the selected implementation of the menu item.

13. The method of claim 12, wherein the executing step executes the selected implementation of the menu item with respect to the selected subwindow.

14. The method of claim 12, further including the steps of:
after the step of executing the selected implementation of the menu item, changing the selected subwindow to be a different subwindow of a different type in response to user input;
after the changing step, receiving user input selecting the menu item;
in response to the step of receiving user input selecting the menu item after the changing step, selecting a second implementation of the menu item based on the type of the changed selected subwindow; and
executing the second implementation of the menu item.

15. A computer-readable medium whose contents cause a computer system to differentially execute implementations of a selected command name based on the type of a selected application window subwindow by performing the steps of:
executing an application program;
under the control of the application program, displaying an application window, the application window having a menu bar containing a command name, the application window further containing a plurality of subwindows each of a different type, one of the subwindows being a selected subwindow;
receiving user input selecting the command name;
in response to the selection of the command name, selecting one of a plurality of implementations of the command name based on the type of the selected subwindow; and
executing the selected implementation of the command name.

16. The computer-readable medium of claim 15, wherein the executing step executes the selected implementation of the command name with respect to the selected subwindow.

17. The computer-readable medium of claim 15, wherein the contents of the computer-readable medium further cause the computer system to perform the steps of:
after the step of executing the selected implementation of the command name, changing the selected subwindow to be a different subwindow of a different type in response to user input;
after the changing step, receiving user input selecting the command name;
in response to the step of receiving user input selecting the command name after the changing step, selecting a second implementation of the command name based on the type of the changed selected subwindow; and
executing the second implementation of the command name.

18. A computer system for differentially executing implementations of a selected menu item based on the type of a selected application window subwindow, comprising:
a processor for executing an application program and menu item implementations;

a display device coupled to the processor for displaying, under the control of the application program, the application window, the application window having a menu bar containing a menu item, the application window further containing a plurality of subwindows each of a different type, one of the subwindows being a selected subwindow;

a user input device coupled to the processor for receiving user input for selecting the menu item;

a menu item implementation selection subsystem for selecting one of a plurality of implementations of the menu item based on the type of the selected subwindow, wherein the processor executes the selected implementation in response to its selection by the menu item implementation selection subsystem.

19. The computer system of claim 18 wherein the user input device is further for receiving user input for selecting one of the plurality of subwindows, further comprising:

a subwindow selection subsystem for selecting one of the application windows in response to user input for selecting one of the plurality of subwindows received by the user input device, wherein the menu item implementation subsystem selects selecting one of a plurality of implementations of the menu item based on the type of the last subwindow selected by the subwindow selection subsystem.

20. A method in a computer system for invoking, from an application program, an implementation of a selected menu item provided by an add-on software component distinct from the application program, the method comprising the steps of:

executing the application program;
under the control of the application program:
accessing the add-on software component distinct from the application program to retrieve from the add-on component a menu item for which the add-on component provides an implementation,
displaying a menu containing the retrieved menu item for which the add-on component provides an implementation,
receiving user input selecting the menu item for which the add-on component provides an implementation, and
invoking the implementation of the selected menu item provided by the add-on component; and
under the control of the add-on component providing the implementation of the selected menu item:
executing the implementation of the selected menu item invoked by the application program.

21. The method of claim 20 wherein the application does not provide implementations of any menu items, and wherein the displaying step displays a menu containing menu items that are exclusively implemented by the add-on component.

22. The method of claim 20 wherein the application does not provide implementations of any menu items, and wherein the accessing step accesses a plurality of add-on software components each distinct from the application program to retrieve from the add-on components menu items for which the add-on components provide implementations, and wherein the displaying step displays a menu containing menu items that are exclusively implemented by the add-on components.

23. A computer-readable medium whose contents cause a computer system to invoke, from an application program, an implementation of a selected menu item provided by an add-on software component distinct from the application program, by performing the steps of:

under the control of the application program:
accessing the add-on software component distinct from the application program to retrieve from the add-on component a menu item for which the add-on component provides an implementation,
displaying a menu containing the retrieved menu item for which the add-on component provides an implementation,
receiving user input selecting the menu item for which the add-on component provides an implementation, and
invoking the implementation of the selected menu item provided by the add-on component; and
under the control of the add-on component providing the implementation of the selected menu item:
executing the implementation of the selected menu item invoked by the application program.

24. The computer-readable medium of claim 23 wherein the application does not provide implementations of any menu items, and wherein the displaying step displays a menu containing menu items that are exclusively implemented by the add-on component.

25. The computer-readable medium of claim 23 wherein the application does not provide implementations of any menu items, and wherein the accessing step accesses a plurality of add-on software components each distinct from the application program to retrieve from the add-on components menu items for which the add-on components provide implementations, and wherein the displaying step displays a menu containing menu items that are exclusively implemented by the add-on components.

* * * * *